(12) United States Patent
Emerson et al.

(10) Patent No.: US 11,052,987 B2
(45) Date of Patent: Jul. 6, 2021

(54) INTEGRALLY DAMPED COMPOSITE AIRCRAFT FLOOR PANELS

(71) Applicant: The Boeing Company, Chicago, IL (US)

(72) Inventors: Craig H. Emerson, Bothell, WA (US); Josh M. Montgomery, Seattle, WA (US); Adam Robert Weston, Brier, WA (US)

(73) Assignee: The Boeing Company, Chicago, IL (US)

( * ) Notice: Subject to any disclaimer, the term of this patent is extended or adjusted under 35 U.S.C. 154(b) by 619 days.

(21) Appl. No.: 15/993,372

(22) Filed: May 30, 2018

(65) Prior Publication Data
US 2019/0367150 A1    Dec. 5, 2019

(51) Int. Cl.
| | |
|---|---|
| *B64C 1/40* | (2006.01) |
| *B32B 37/02* | (2006.01) |
| *B32B 38/00* | (2006.01) |
| *B32B 37/10* | (2006.01) |
| *B32B 37/14* | (2006.01) |

(Continued)

(52) U.S. Cl.
CPC ............. *B64C 1/40* (2013.01); *B32B 3/12* (2013.01); *B32B 37/02* (2013.01); *B32B 37/10* (2013.01); *B32B 37/146* (2013.01); *B32B 38/00* (2013.01); *B64C 1/18* (2013.01); *G10K 11/168* (2013.01); *B32B 2038/0076* (2013.01); *B32B 2250/03* (2013.01); *B32B 2255/00* (2013.01); *B32B 2260/04* (2013.01); *B32B 2305/72* (2013.01); *B32B 2307/10* (2013.01); *B32B 2471/00* (2013.01); *B32B 2605/18* (2013.01)

(58) Field of Classification Search
CPC .... B64C 1/40; B64C 1/18; B32B 3/12; B32B 37/02; B32B 37/10; B32B 37/146; B32B 38/00; B32B 2038/0076; B32B 2250/03; B32B 2255/00; B32B 2260/04; B32B 2305/72; B32B 2307/10; B32B 2471/00; B32B 2605/18; G10K 11/168
See application file for complete search history.

(56) References Cited

U.S. PATENT DOCUMENTS 6,536,556 B2 * 3/2003 Porte .................... G10K 11/172
                                                      181/292
6,569,509 B1 * 5/2003 Alts ........................ B32B 3/20
                                                      181/284

(Continued)

FOREIGN PATENT DOCUMENTS

EP            3043346 A1 *  7/2016  ........... G10K 11/168

OTHER PUBLICATIONS

Davis, M.J. et al., "Honeycomb Bond and CoreDurability Issues; Experiences within CREDP Nations," Aging Aircraft Conference, Williamsburg, VA, Aug. 31-Sep. 2 1998, 13 pages.

*Primary Examiner* — Forrest M Phillips
(74) *Attorney, Agent, or Firm* — Yee & Associates, P.C.

(57) ABSTRACT

A sound-damping panel. The sound-damping panel includes a first face sheet. The sound-damping panel also includes a core connected to the first face sheet. The core has a honeycomb structure. Walls of the honeycomb structure are embedded with a viscoelastic material configured to dampen sound in a pre-selected frequency range. The sound-damping panel also includes a second face sheet connected to the core, the second face sheet opposite the first face sheet relative to the core.

20 Claims, 8 Drawing Sheets

(51) Int. Cl.
    *G10K 11/168*     (2006.01)
    *B64C 1/18*     (2006.01)
    *B32B 3/12*     (2006.01)

(56) References Cited

U.S. PATENT DOCUMENTS

| | | | |
|---|---|---|---|
| 6,840,349 B2 * | 1/2005 | Andre | G10K 11/172 |
| | | | 181/290 |
| 7,938,224 B2 * | 5/2011 | Frustie | F02C 7/047 |
| | | | 181/214 |
| 9,382,962 B2 * | 7/2016 | Scarpa | F16F 7/121 |
| 10,040,535 B2 * | 8/2018 | Futatsugi | B64C 1/40 |
| 2007/0102239 A1 * | 5/2007 | Liguore | B32B 27/38 |
| | | | 181/292 |
| 2017/0158307 A1 * | 6/2017 | Futatsugi | G10K 11/172 |
| 2021/0001787 A1 * | 1/2021 | Schulze | B60R 13/0815 |

\* cited by examiner

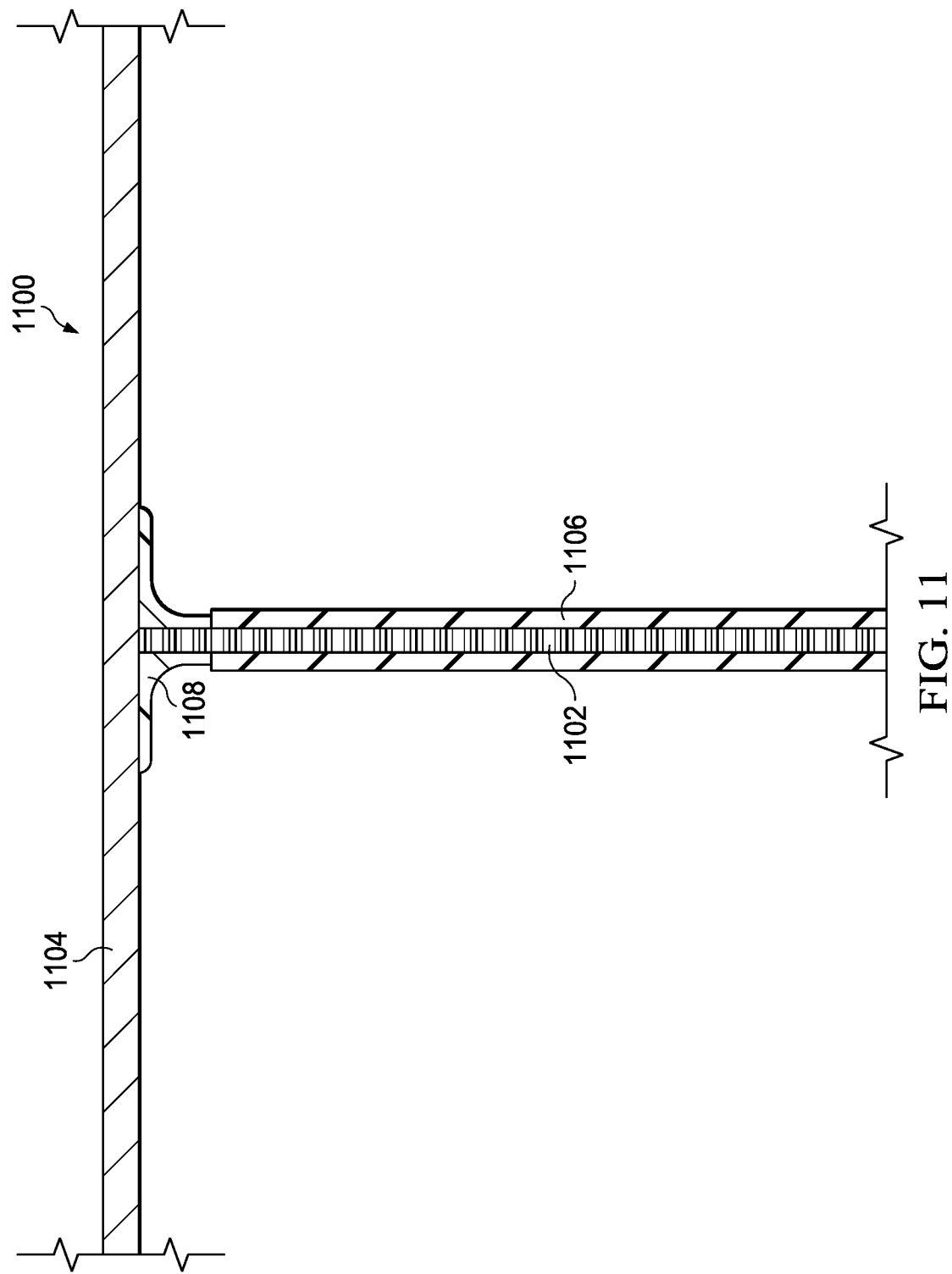

US 11,052,987 B2

INTEGRALLY DAMPED COMPOSITE AIRCRAFT FLOOR PANELS

BACKGROUND INFORMATION

1. Field

The present disclosure relates to devices and methods for reducing noise inside vehicles, such as aircraft, and more particularly relate to integrally damped composite aircraft floor panels.

2. Background

Current floor panels in aircraft have damping tiles attached to the underside of the panel. These damping tiles lower sound levels in the cabin of the aircraft. Similar panels may be used in other vehicles, such as automobiles, and may even be used in buildings in order to reduce noise inside a room or to prevent noise from leaving a room.

However, particularly in aircraft, weight is a serious consideration. Fuel can be one of the major operating expenses of operating an aircraft, and the heavier the plane is, the more fuel is used during operation. Therefore, techniques for reducing the weight of aircraft are usually desirable.

SUMMARY

The illustrative embodiments provide for a sound-damping panel. The sound-damping panel includes a first face sheet. The sound-damping panel also includes a core connected to the first face sheet. The core has a honeycomb structure. Walls of the honeycomb structure are embedded with a viscoelastic material configured to dampen sound in a pre-selected frequency range. The sound-damping panel also includes a second face sheet connected to the core, the second face sheet opposite the first face sheet relative to the core.

The illustrative embodiments also include a method of forming a sound-damping panel. The method includes fabricating a honeycomb core. The method also includes coating the honeycomb core with a viscoelastic fluid configured to dampen sound in a pre-selected frequency range. The method also includes thereafter curing the honeycomb core. The method also includes thereafter laying up a first face sheet on a first side of the honeycomb core and laying up a second face sheet on a second side of the honeycomb core, opposite the first side. In this manner, the sound-damping panel is formed.

The illustrative embodiments also include a method of forming a sound-damping panel. The method includes fabricating a honeycomb core. The method also includes pressing an elastomeric film into the honeycomb core. The elastomeric film is a material configured to dampen sound in a pre-selected frequency range. The method also includes thereafter curing the honeycomb core. The method also includes thereafter laying up a first face sheet on a first side of the honeycomb core and laying up a second face sheet on a second side of the honeycomb core, opposite the first side. In this manner, the sound-damping panel is formed.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 11 is an illustration of a portion of a sound-damping panel, in accordance with an illustrative embodiment.

DETAILED DESCRIPTION

Figure 1:
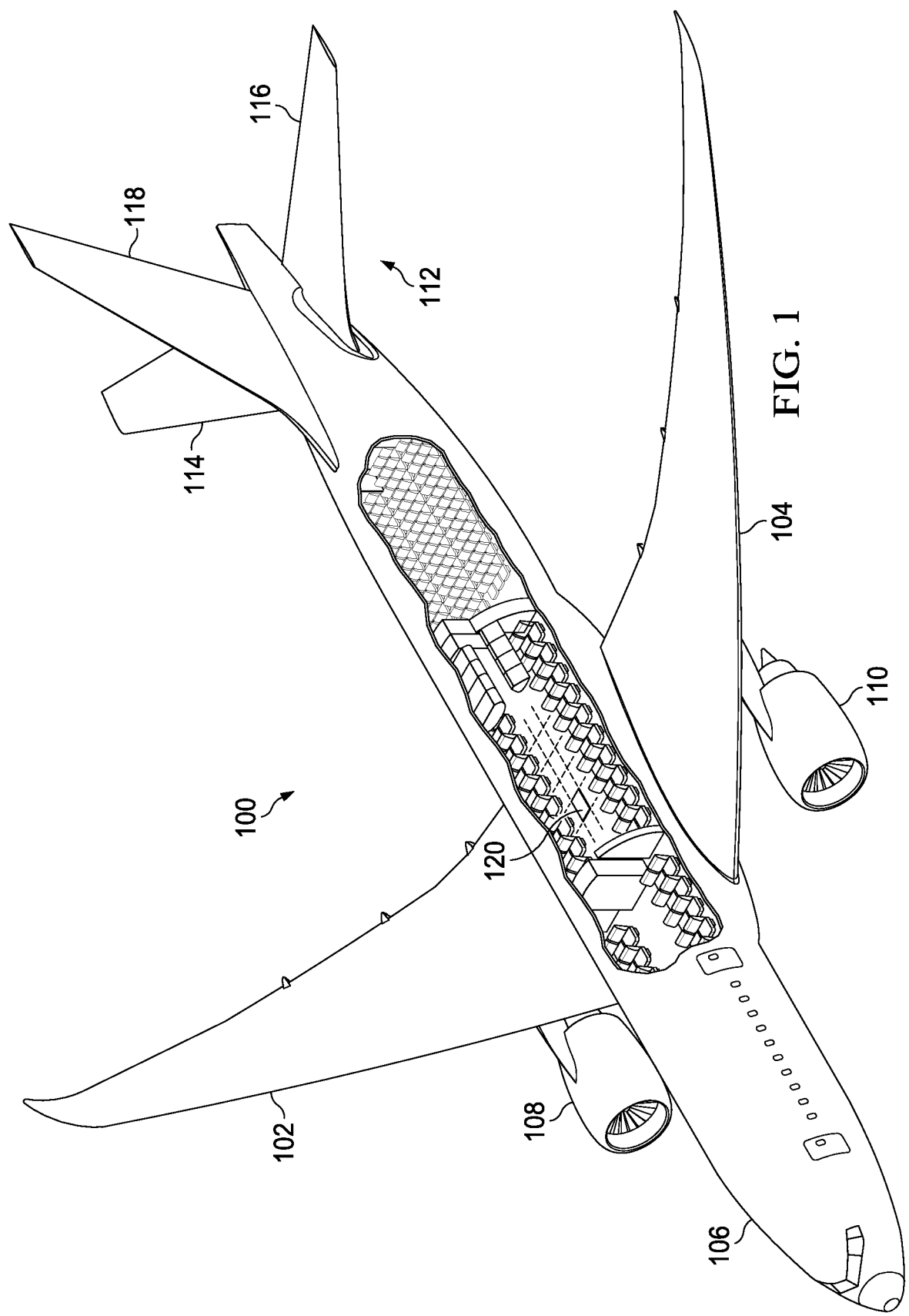
FIG. 1 illustrates an aircraft, in accordance with an illustrative embodiment.

The illustrative embodiments recognize and take into account that existing sound-damping panels include face sheets sandwiching a honeycomb core, plus one or more additional layers of sound-damping material. The illustrative embodiments also recognize and take into account that existing sound-damping panels are undesirably heavy and add excessive recurring cost for aircraft applications. For example, for typical floor panels in commercial aircraft, just the sound-damping layer or layers of the panels may weight a hundred pounds or more to an aircraft. The illustrative embodiments recognize and take into account that this extra weight significantly reduces fuel efficiency of the aircraft, thereby leading to higher costs of operating the aircraft. Recurring costs for the sound-damping material and installation costs degrade the aircraft profitability.

The illustrative embodiments address these and other issues by eliminating or greatly reducing the need for additional sound-damping layers in aircraft panels. In particular, the illustrative embodiments provide for integrating damping within the honeycomb structure of a penal. By avoiding or reducing additional sound-damping layers, the illustrative embodiments can both substantially reduce the weight of the aircraft, as well as maintain the same or better sound-damping properties of the aircraft panel.

The illustrative embodiments accomplish this advantage by placing a viscoelastic material inside the honeycomb, without sacrificing structural strength. This structure may be achieved through a liquid coating, embedding an elastomeric material, or some other fabrication technique.

The illustrative embodiments avoid use of a polypropylene core. Such a core material is sub-optimal structurally and would not be used in the aircraft floor, and possibly other portions of the aircraft.

The illustrative embodiments also do not rely on the face sheets for sound-damping, thereby further allowing different materials to be selected for the face sheets while still maintaining the desired acoustic properties of the panel. In turn, this advantage reduces aircraft weight, and accordingly, reduces both fuel and money required to operate the aircraft.

Thus, the illustrative embodiments provide for an apparatus that achieves acoustic damping in a crew cabin via honeycomb flooring panels integrated into the crew cabin which include embedded dampers consisting of liquid coating, foaming of an elastomeric, or some other fabrication technique. Said flooring does not use a polypropylene core, and does not rely on a face sheet for acoustic damping.

The panels of the illustrative embodiments are not limited to aircraft panels. The illustrative embodiments contemplate use of the panels described herein in any vehicle, including but not limited to automobiles, trucks, ships, tanks, helicopters. The illustrative embodiments also contemplate use of the panels described herein in buildings or rooms within buildings for sound proofing.

Attention is now turned to additional details regarding the design of sound-damping panels, especially those for use in aircraft. A common method for reducing noise from passenger floors into the aircraft cabin is through structural damping. The prior art damping designs are based on the principles described in D. Ross, E. E. Ungar, and E. M. Kerwin, Jr., in Structural Damping, The American Society of Mechanical Engineers, 1959. Essentially, a layer of material is added to a panel which is pre-selected to reduce acoustic frequencies in a pre-determined range.

The goal for vibration of the base panel is to induce strain energy into the viscoelastic material layer, which dissipates the vibration energy into heat. Lower vibration in the panel leads to lower noise radiated into the cabin. For a free-layer damper, the strain energy is introduced through extension of the viscoelastic. For a constrained layer damper, the strain energy is introduced through shear forces.

For aerospace applications, weight is important to the overall design. A constrained layer damper (CLD) is typically five times more weight efficient than the free-layer damper, so the use of CLD is much more common in aerospace applications.

Even with a weight-optimized design, there can be upwards of a hundred pounds of floor damping added to the airplane. Driving weight out of the detailed part design adds to the material cost. The CLD tends to be an expensive, highly engineered sandwich material with multiple constituent materials. Driving out weight also pushes the envelope on the robustness and durability of the parts, leading to more frequent inconsistencies and rework maintenance. Additionally, the reduced robustness also tends to dictate more, smaller parts for ease of installation, which results in higher labor cost.

One unique aspect of the illustrative embodiments is to drive the performance of the damping treatment into the build of the panel. This technique eliminates the issue of additional maintenance, automates the installation of noise control material, and utilizes an overall simpler design with lower material costs. This advantage would be true whether the viscoelastic material is integrated into the core or the face sheet of the sandwich panel. Nevertheless, the illustrative embodiments contemplate targeting mid-range acoustic frequencies to high-range acoustic frequencies (400 Hz-10,000 Hz). The illustrative embodiments also recognize and take into account that the strain energy in the sandwich structure transitions more and more to core as frequency increases. Thus, the illustrative embodiments contemplate incorporating the sound-damping material in the core itself. However, in other illustrative embodiments, the techniques described herein could be applied to one or more face sheets, or one or more additional layers for a given panel.

The improved sound-damping effects of the panels described herein have other benefits. For example, the improved performance of the panels described herein allow for reduction in noise control treatment in other areas of the aircraft cabin, such as acoustic blankets in the sidewall or damping treatment on the primary fuselage of the aircraft.

FIG. 1 illustrates an aircraft, in accordance with an illustrative embodiment. Aircraft 100 is an example of an aircraft in which the sound-damping panels of the illustrative embodiments may be installed.

In this illustrative example, aircraft 100 has wing 102 and wing 104 attached to body 106. Aircraft 100 includes engine 108 attached to wing 102 and engine 110 attached to wing 104. Aircraft 100 could be any other aircraft, such as a prop aircraft, a helicopter, or some other moveable platform such as an automobile, a boat, or even a building.

Aircraft 100 may have other features. For example, body 106 has tail section 112. Horizontal stabilizer 114, horizontal stabilizer 116, and vertical stabilizer 118 are attached to tail section 112 of body 106.

A portion of body 106 is cut away to show a portion of the interior of aircraft 100. As can be seen, the floor of the interior cabin is formed from floor panels, such as floor panel 120. Floor panel 120 is a sound-damping panel, such as those described with respect to FIG. 2 through FIG. 7.

Note that while floor panel 120 is a sound-damping panel as described herein, not all floor panels need be of the sound-damping variety described herein. Likewise, panels other than those present in the floor may have the sound-damping structure described elsewhere herein. Further, some or all of body 106 of aircraft and aircraft interiors may be formed from a honeycomb structure having the sound-damping structure described elsewhere herein. Yet further, the sound-damping structures described herein may also apply to other types of vehicles or to buildings. Thus, the illustrative embodiments are not necessarily limited to floorboards within aircraft.

Figure 2:
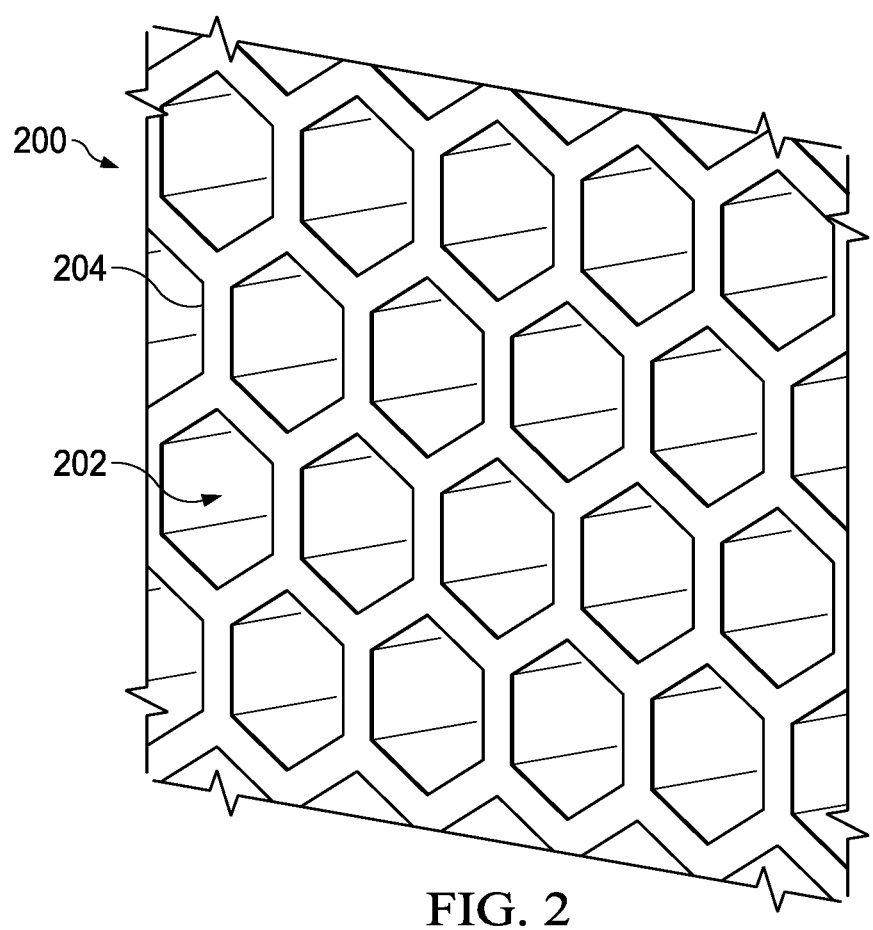
FIG. 2 illustrates a honeycomb core of a sound-damping panel, in accordance with an illustrative embodiment.

FIG. 2 illustrates a honeycomb core of a sound-damping panel, in accordance with an illustrative embodiment. Honeycomb core 200 may be part of a sound-damping panel, such as floor panel 120 of FIG. 1.

As can be seen in FIG. 2, honeycomb core 200 is composed of interconnected walls, such as walls forming cell 202, which form a hexagonal pattern between which are defined interstices, such as interstice 204. Note that the size and period of the interstices may vary. In some illustrative embodiments, differently sized hexagons may be present in the same honeycomb core. The illustrative embodiments are not limited to hexagonal shapes. The shape of the cells may be rectangular, diamond, circular, or any other suitable shape.

In an illustrative embodiment, suitable materials for forming honeycomb core 200 may be metal (such as but not limited to aluminum) or fiber reinforced composite—typically an aramid (such as but not limited to Kevlar or Nomex) fiber in a resin matrix. These honeycomb structures can be used in other types of aircraft structures, such as but not limited to crew bunk modules, partitions, wing-to-body fairing panels, ceiling panels, and others.

Figure 3:
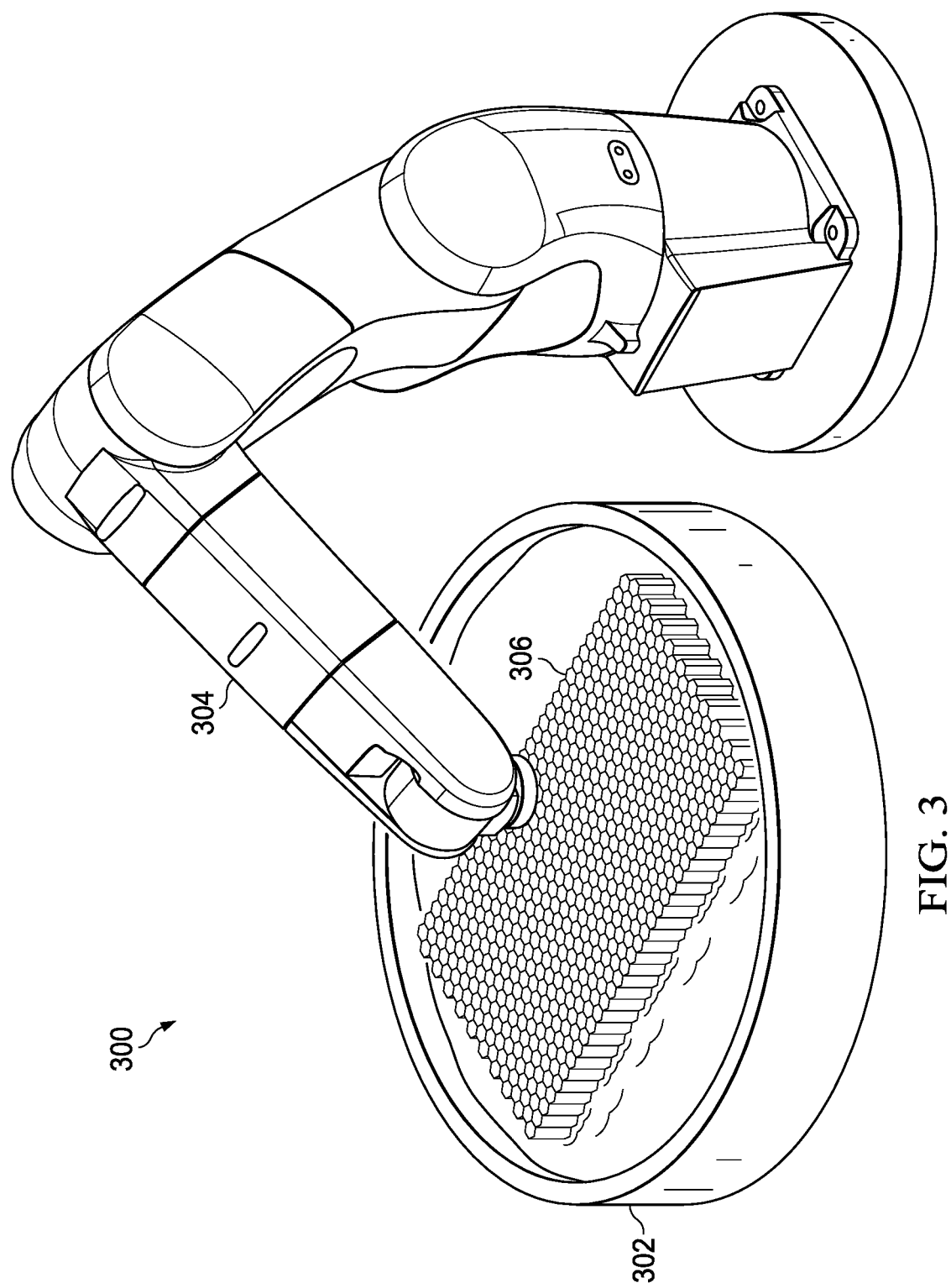
FIG. 3 illustrates an apparatus for performing coating by dipping a honeycomb core, in accordance with an illustrative embodiment.

FIG. 3 illustrates an apparatus for performing coating by dipping a honeycomb core, in accordance with an illustrative embodiment. Apparatus 300 is an example of an apparatus that may be used to modify a honeycomb core, such as honeycomb core 200 of FIG. 2 to serve as an integrally damped composite aircraft floor panel, such as floor panel 120 of FIG. 1, or any other suitable sound-damping panel as described elsewhere herein.

Apparatus 300 includes vat 302 which contains elastomeric fluid or viscoelastic fluid. Apparatus 300 also includes arm 304 which may be operated robotically using a power supply and a controller, or which may be operated manually. Arm 304 holds workpiece 306, which may be a honeycomb structure such as those described above. Whether automated or manually controlled, arm 304 dips workpiece 306 into vat 302, thereby immersing workpiece 306 into the elastomeric fluid. In this manner, workpiece 306 is coated.

The elastomeric fluid composition may be varied, though the material is selected for properties which will reduce pre-determined frequency ranges of acoustic energy. Some examples include thermoplastic polyurethanes or polyalkenes.

Still other variations are possible. Therefore, the illustrative embodiments described with respect to FIG. 3 do not necessarily limit the other illustrative embodiments described herein.

Figure 4:
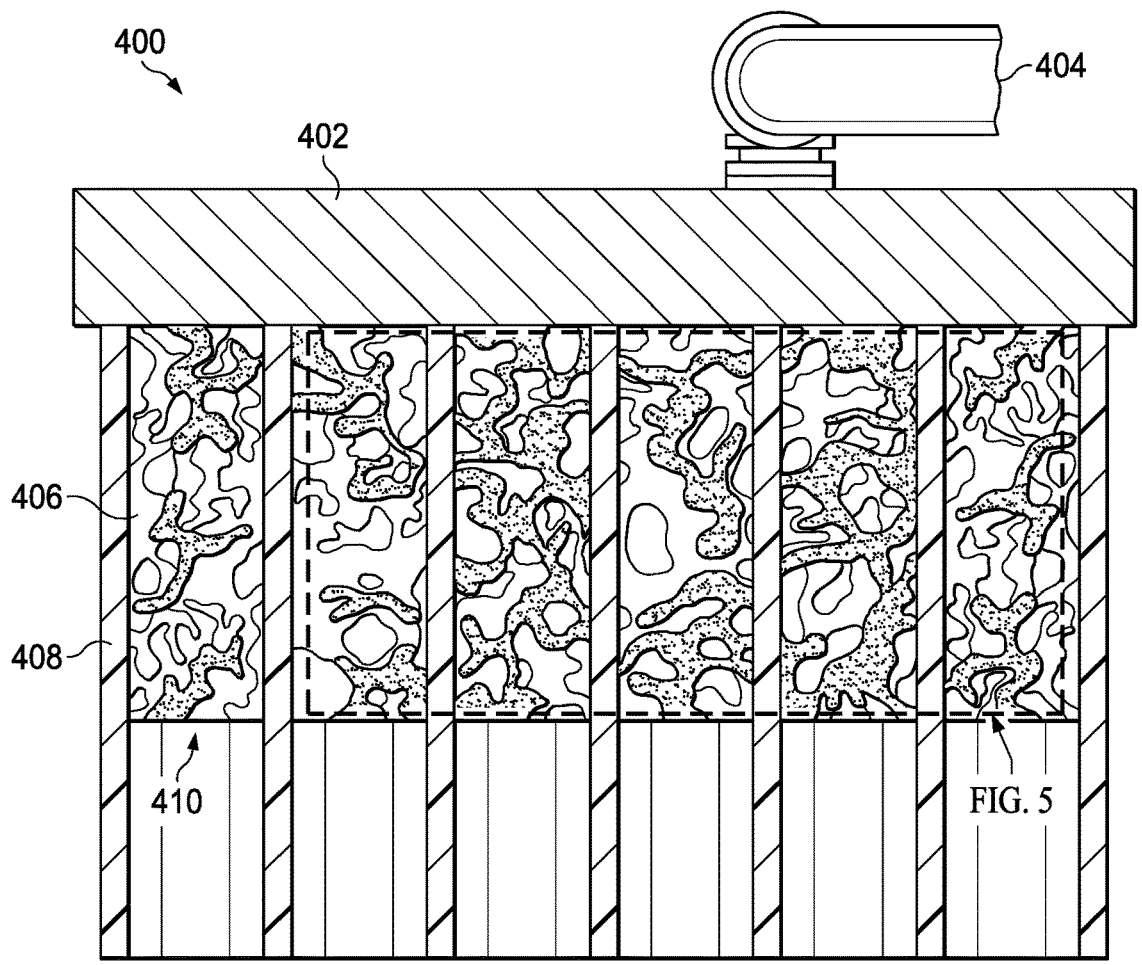
FIG. 4 illustrates an apparatus for pressing an elastomeric film into a honeycomb core, in accordance with an illustrative embodiment.

FIG. 4 illustrates an apparatus for pressing an elastomeric film into a honeycomb core, in accordance with an illustrative embodiment. Apparatus 400 is an example of an apparatus that may be used to modify a honeycomb core, such as honeycomb core 200 of FIG. 2 to serve as an integrally damped composite aircraft floor panel, such as floor panel 120 of FIG. 1, or any other suitable sound-damping panel as described elsewhere herein.

Apparatus 400 includes pressure plate 402 which is actuated either by robotic arm 404, a hydraulic press, by manual operation, or by some other machine. When actuated, pressure plate 402 presses viscoelastic film 406 into honeycomb structure 408. Thus, material of viscoelastic film 406, shown for example at area 410, is pressed into the interstices of honeycomb structure 408.

The elastomeric film composition may be varied, though the material is selected for properties which will reduce pre-determined frequency ranges of acoustic energy. Some examples include natural or synthetic rubbers and cured thermoplastic polyurethanes.

Still other variations are possible. Therefore, the illustrative embodiments described with respect to FIG. 4 do not necessarily limit the other illustrative embodiments described herein.

Figure 5:
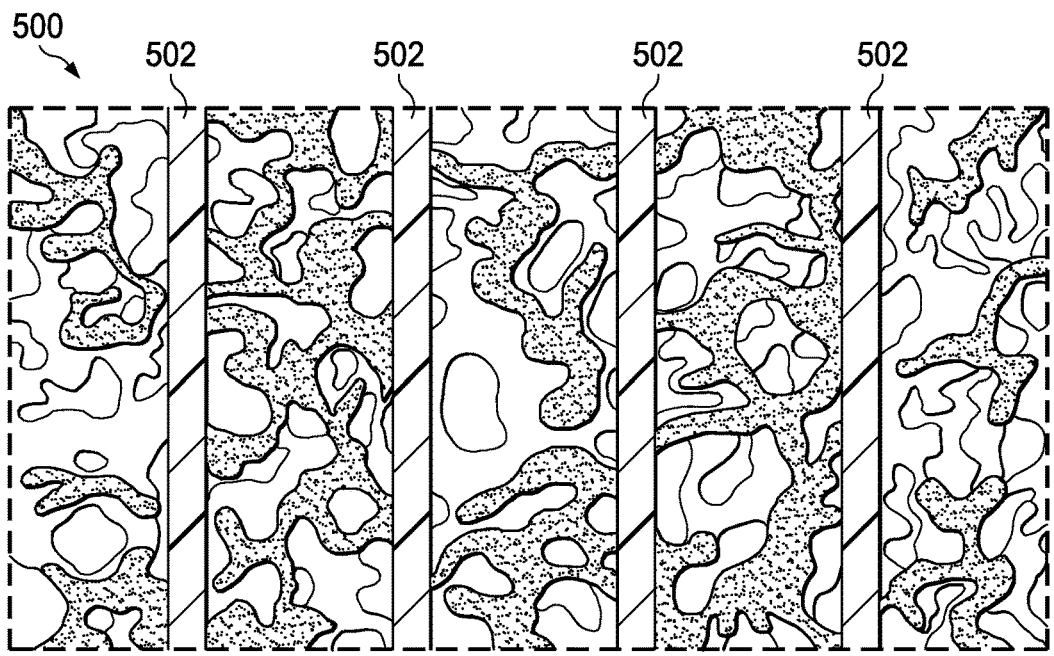
FIG. 5 illustrates a close-up perspective of certain cells of the honeycomb core shown in FIG. 4, in accordance with an illustrative embodiment.

FIG. 5 illustrates a close-up perspective of certain cells of the honeycomb core shown in FIG. 4, in accordance with an illustrative embodiment. Honeycomb structure 500 is a close-up perspective of honeycomb structure 408 of FIG. 4, particularly where the elastomeric film 406 has been pressed into the interstices of honeycomb structure 500. Walls 502 of honeycomb structure 500 are pointed out for reference.

The interstices between walls are filled with the material of elastomeric film 406 of FIG. 4. However, additional processing may be performed at this point. Additional curing, which may be either at elevated temperature or at room temperature, may be applied to honeycomb structure 500.

Still other variations are possible. Therefore, the illustrative embodiments described with respect to FIG. 5 do not necessarily limit the other illustrative embodiments described herein.

Figure 6:
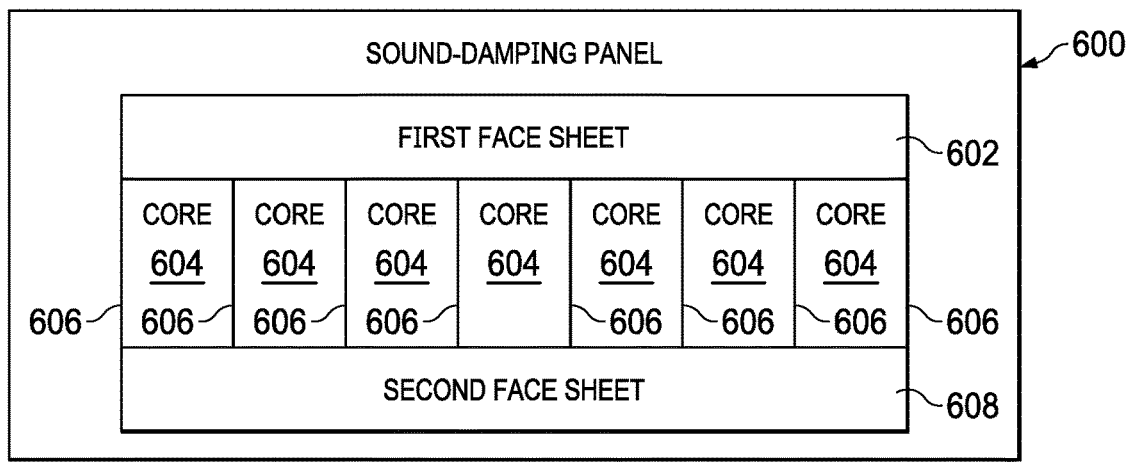
FIG. 6 illustrates a sound-damping panel, in accordance with an illustrative embodiment.

FIG. 6 illustrates a sound-damping panel, in accordance with an illustrative embodiment. Sound-damping panel 600 is a variation of apparatus 400 shown in FIG. 4, or the other sound-damping panels described herein.

Sound-damping panel 600 includes first face sheet 602. Sound-damping panel 600 also includes core 604 connected to first face sheet 602. Core 604 has a honeycomb structure. Walls 606 of the honeycomb structure are embedded with a viscoelastic material configured to dampen sound in a pre-selected frequency range. Sound-damping panel 600 also includes second face sheet 608 connected to core 604. Second face sheet 608 is disposed opposite of first face sheet 602 relative to core 604.

The illustrative embodiments described with respect to FIG. 6 may be varied. For example, sound-damping panel 600 may be a floor board for installation in an aircraft. In another illustrative embodiment, walls 606 of the honeycomb structure may be coated with the viscoelastic material. However, in a different illustrative embodiment, walls 606 of the honeycomb structure may be infused with the viscoelastic material.

In yet another illustrative embodiment, only the first face sheet, the core, and the second face sheet are present in the sound-damping panel. In this manner, a sound-damping layer in the sound-damping panel is avoided. Thus, the illustrative embodiments may produce the desired sound-damping effects without the added weight of additional sound-damping layers. The total weight savings may be between about 20% to 50% reduction in weight per panel. The total cost savings may be between about 40% to 60% per panel. Accordingly, the illustrative embodiments provide for a significant advance over the known art and significant fuel and cost savings to operating an aircraft.

In still another illustrative embodiment, core 604 is free of polypropylene. In yet another illustrative embodiment, first face sheet 602 and second face sheet 608 may be free of the viscoelastic material. Thus, again, the illustrative embodiments may produce the desired sound-damping effects without the added weight of additional sound-damping layers. Accordingly, the illustrative embodiments provide for a significant advance over the known art and significant fuel and cost savings to operating an aircraft.

Still other variations are possible. Therefore, the illustrative embodiments described with respect to FIG. 6 do not necessarily limit the other illustrative embodiments described herein.

Figure 7:
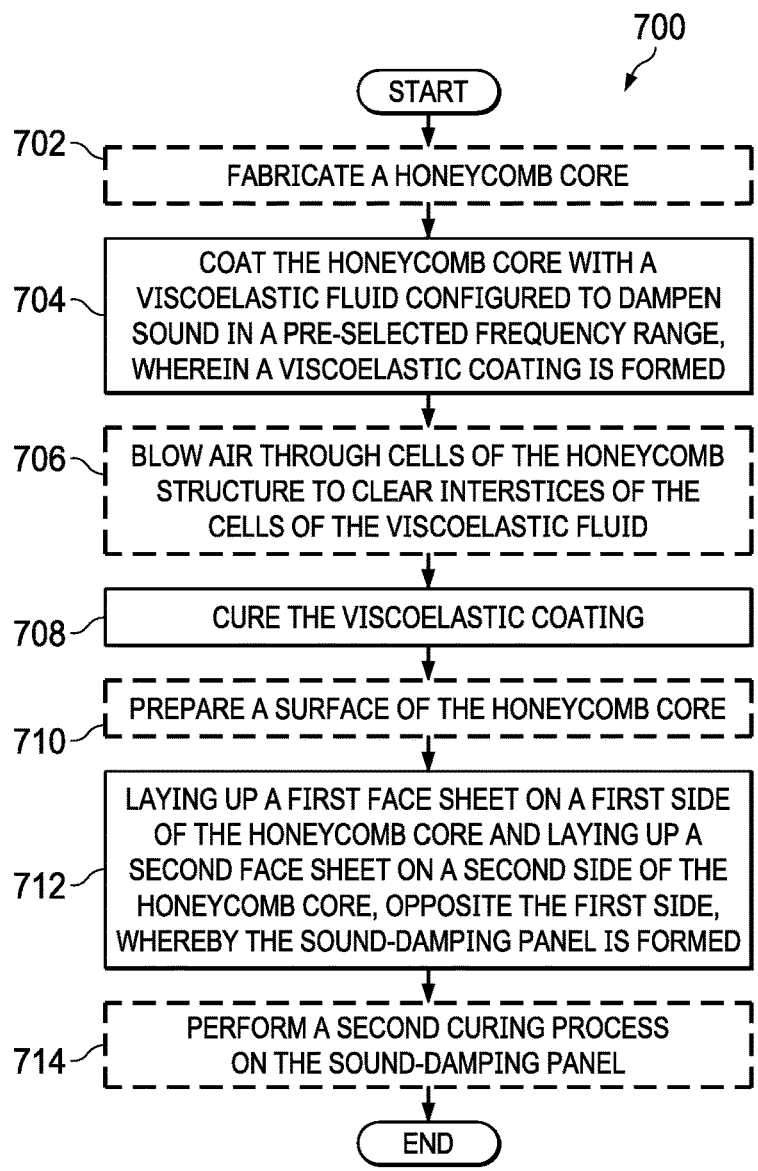
FIG. 7 illustrates a method of forming a sound-damping panel, in accordance with an illustrative embodiment.

FIG. 7 illustrates a method of forming a sound-damping panel, in accordance with an illustrative embodiment. Method 700 may be a variation of the methods described elsewhere herein, such as the forming technique described with respect to FIG. 3 through FIG. 4. Operations shown with dashed boxes are optional.

Method 700 includes fabricating a honeycomb core (operation 702). The term "fabricating" contemplates both actively fabricating or making the honeycomb structure, as well as simply providing the honeycomb structure. Method 700 also includes coating the honeycomb core with a viscoelastic fluid configured to dampen sound in a pre-selected frequency range, wherein a viscoelastic coating is formed (operation 704). This coating may be a structural resin which effectively mimics a constrained damping layer. A structural resin would be applied after the viscoelastic fluid is cured. Then the resin would mimic a constrained damping layer. Otherwise, as is described elsewhere herein, the coating is unconstrained.

Method 700 also includes thereafter curing the viscoelastic coating (operation 706). Method 700 also includes thereafter laying up a first face sheet on a first side of the honeycomb core and laying up a second face sheet on a second side of the honeycomb core, opposite the first side, whereby the sound-damping panel is formed (operation 710). In one illustrative embodiment, the method may terminate thereafter.

Method 700 may be varied. For example, coating at operation 704 may include using a coating technique comprising translating the honeycomb core through a flow of the viscoelastic fluid. In another example, coating at operation 704 may include coating comprising dipping the honeycomb core in the viscoelastic fluid.

Method 700 may also have additional operations. For example, optionally, method 700 also includes, prior to curing the honeycomb core, blowing air through cells of the honeycomb structure to clear interstices of the cells of the viscoelastic fluid (operation 706). In a variation, curing at operation 708 comprises curing at room temperature. Curing could also be performed at an elevated temperature.

Still other variations are possible. For example, method 700 also may include, after curing but prior to laying up the first face sheet, preparing a surface of the honeycomb core (operation 710). In another example, method 700 also includes, after laying up the first face sheet and the second face sheet, performing a second curing process on the sound-damping panel (operation 714).

Method 700 may also be exclusive. Thus, for example, after performing only fabricating, coating, curing, and laying up the first face sheet and the second face sheet, formation of the sound-damping panel is complete. In this manner, no additional layers are added to the sound-damping panel. The resulting sound-damping panel weighs less than conventional sound-damping panels, which do require additional layers of damping material.

Still other variations are possible. Therefore, the illustrative embodiments described with respect to FIG. 7 do not necessarily limit the other illustrative embodiments described herein.

Figure 8:
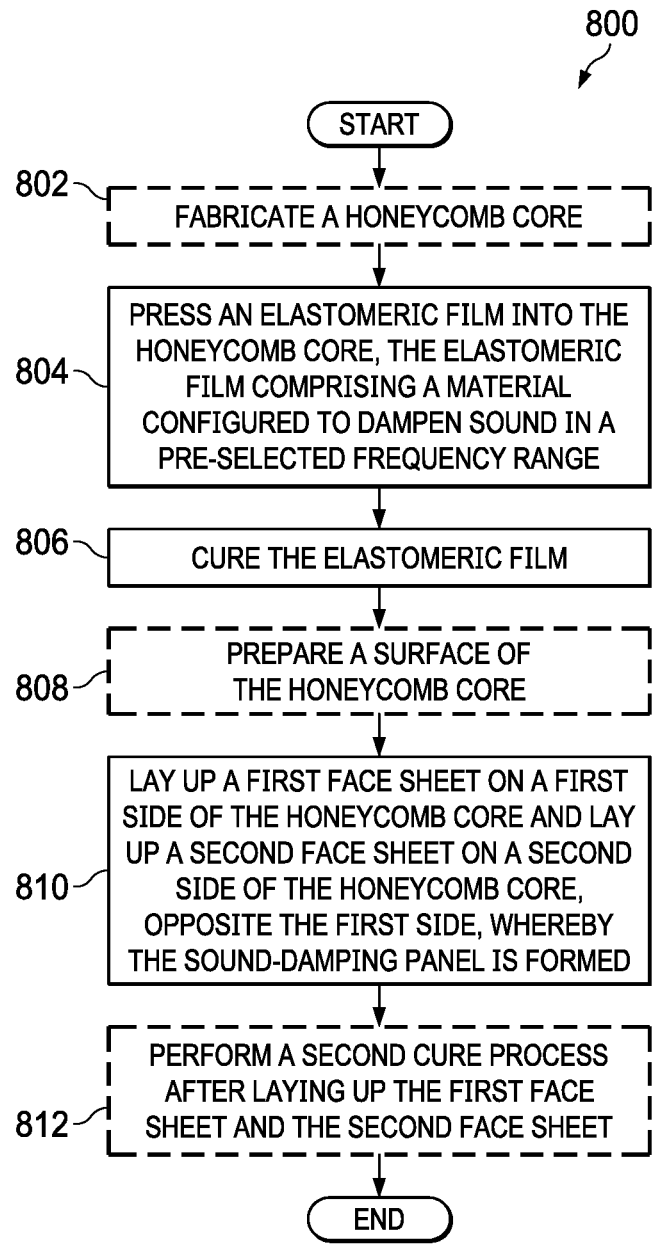
FIG. 8 illustrates a method of forming a sound-damping panel, in accordance with an illustrative embodiment.

FIG. 8 illustrates a method of forming a sound-damping panel, in accordance with an illustrative embodiment. Method 800 may be a variation of the methods described elsewhere herein, such as the forming technique described with respect to FIG. 3 through FIG. 4, as well as FIG. 7. Operations shown with dashed boxes are optional.

Method 800 includes fabricating a honeycomb core (operation 802). The term "fabricating" contemplates both actively fabricating or making the honeycomb structure, as well as simply providing the honeycomb structure. Method 800 also includes pressing an elastomeric film into the honeycomb core, the elastomeric film comprising a material configured to dampen sound in a pre-selected frequency range (operation 804). Method 800 also includes thereafter curing the elastomeric film (operation 806). Method 800 also includes thereafter laying up a first face sheet on a first side of the honeycomb core and laying up a second face sheet on a second side of the honeycomb core, opposite the first side, whereby the sound-damping panel is formed (operation 810). In one illustrative embodiment, the method may terminate thereafter.

Method 800 may be varied. For example, method 800 also may include performing a second cure process after laying up the first face sheet and the second face sheet (operation 812). In yet another example, method 800 also may include, after curing but prior to laying up the first face sheet, preparing a surface of the honeycomb core (operation 808). Again, preparing may include sanding, etching, cutting, or other methods of preparing a surface for further processing.

In another illustrative embodiment, after performing only fabricating, pressing, curing, and laying up the first face sheet and the second face sheet, formation of the sound-damping panel is complete. In this manner, no additional layers are added to the sound-damping panel. The resulting sound-damping panel weighs less than conventional sound-damping panels, which do require additional layers of damping material.

Still other variations are possible. Therefore, the illustrative embodiments described with respect to FIG. 8 do not necessarily limit the other illustrative embodiments described herein.

Figure 9:
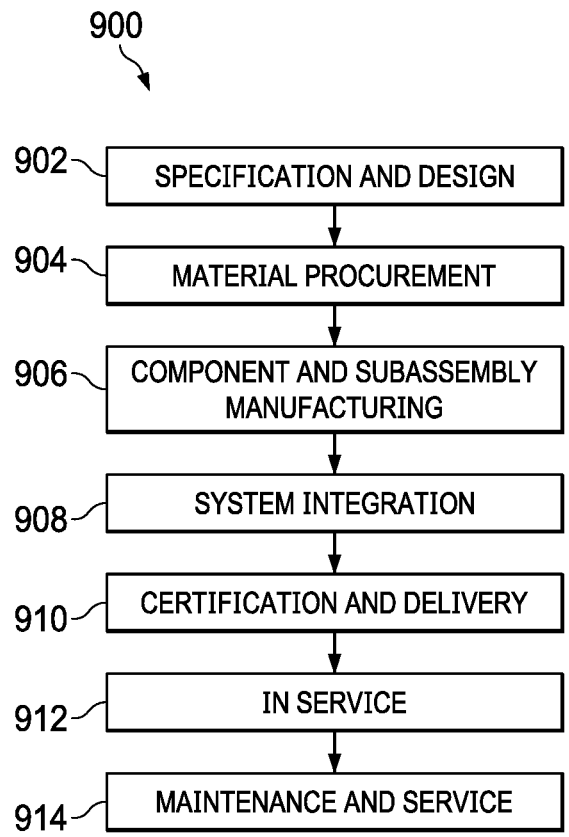
FIG. 9 is an illustration of an aircraft manufacturing and service method, in accordance with an illustrative embodiment.
Figure 10:
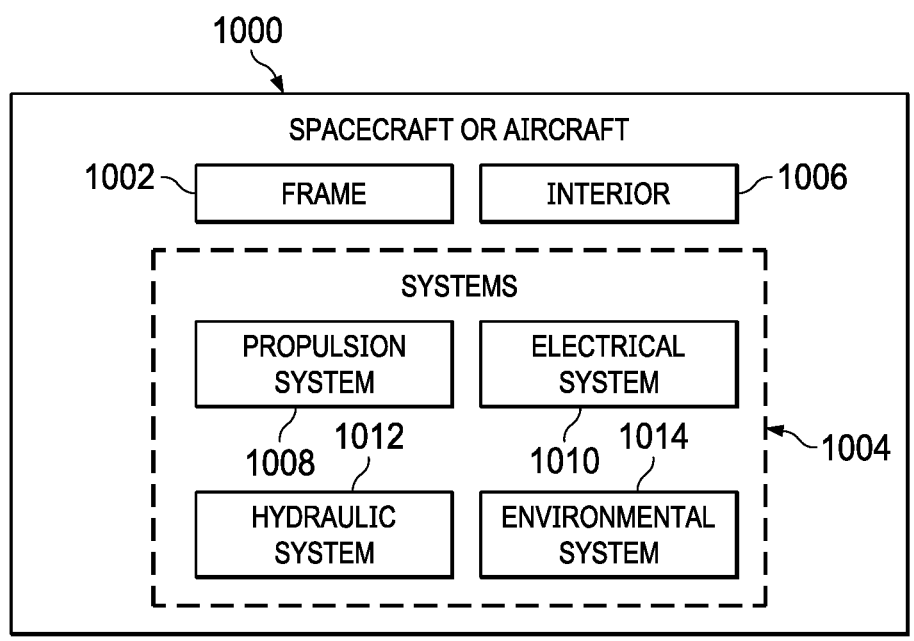
FIG. 10 is an illustration of an aircraft, in accordance with an illustrative embodiment.

Illustrative embodiments of the disclosure may be described in the context of aircraft manufacturing and service method 900 as shown in FIG. 9 and aircraft 1000 as shown in FIG. 10. However, the illustrative embodiments described herein are applicable to any machine or vehicle that uses an exhaust system or exhaust pipe, including but not limited to automobiles and generators. The techniques described herein may be used to manufacture aircraft 1000 using aircraft manufacturing and service method 900. The techniques described with respect to FIG. 9 and FIG. 10 may take advantage of the inspections systems, devices, and methods described with respect to FIG. 1 through FIG. 8.

Turning first to FIG. 9, an illustration of an aircraft manufacturing and service method is depicted in accordance with an illustrative embodiment. During pre-production, aircraft manufacturing and service method 900 may include specification and design 902 of aircraft 1000 in FIG. 10 and material procurement 904.

During production, component and subassembly manufacturing 906 and system integration 908 of aircraft 1000 in FIG. 10 takes place. Thereafter, aircraft 1000 in FIG. 10 may go through certification and delivery 910 in order to be placed in service 912. While in service 912 by a customer, aircraft 1000 in FIG. 10 is scheduled for routine maintenance and service 914, which may include modification, reconfiguration, refurbishment, and other maintenance or service.

Each of the processes of aircraft manufacturing and service method 900 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 10, an illustration of an aircraft is depicted in which an illustrative embodiment may be implemented. In this example, aircraft 1000 is produced by aircraft manufacturing and service method 900 in FIG. 9 and may include airframe 1002 with plurality of systems 1004 and interior 1006. Examples of systems 1004 include one or more of propulsion system 1008, electrical system 1010, hydraulic system 1012, and environmental system 1014. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 900 in FIG. 9.

In one illustrative example, components or subassemblies produced in component and subassembly manufacturing 906 in FIG. 9 may be fabricated or manufactured in a manner similar to components or subassemblies produced while aircraft 1000 is in service 912 in FIG. 9. As yet another example, one or more apparatus embodiments, method embodiments, or a combination thereof may be utilized during production stages, such as component and subassembly manufacturing 906 and system integration 908 in FIG. 9. One or more apparatus embodiments, method embodiments, or a combination thereof may be utilized while aircraft 1000 is in service 912 and/or during maintenance and service 914 in FIG. 9. The use of a number of the different illustrative embodiments may substantially expedite the assembly of and/or reduce the cost of aircraft 1000.

The illustrative embodiments described herein with respect to FIG. 2 through FIG. 8 use examples where one coating is applied to the honeycomb structure. However, the illustrative embodiments also contemplate multiple coating and cure cycles to increase the thickness of the elastomeric sound-damping material included in the honeycomb structure. The illustrative embodiments contemplate still other variations, such as that described with respect to FIG. 11.

FIG. 11 is an illustration of a portion of a sound-damping panel, in accordance with an illustrative embodiment. Sound-damping panel 1100 may be a variation of the panels described with respect to FIG. 2 through FIG. 6.

Sound-damping panel 1100 is a honeycomb structure including one or more face sheets and a honeycomb core. Sound-damping panel 1100 includes core cell wall 1102 and face sheet 1104. A second face sheet, opposite of face sheet 1104, may be present, but is not shown in FIG. 11. Elastomeric coating 1106 is disposed on core cell wall 1102. However, elastomeric coating 1106 does not extend on or past resin fillet 1108.

Resin fillet 1108 is a portion of resin that is used to secure face sheet 1104 to core cell wall 1102. Resin fillet 1108 extends on both sides of core cell wall 1102, as shown in FIG. 11. By preventing elastomeric coating 1106 from impinging on resin fillet 1108, the mechanical and structural performance of sound-damping panel 1100 can be maintained to a degree greater than if elastomeric coating 1106 had impinged on resin fillet 1108. Compromising the fillet integrity with the elastomer could degrade performance of the panel or undesirable over-design of the face sheets and/or core.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A sound-damping panel comprising:
A first face sheet;
A core connected to the first face sheet, the core having a honeycomb structure comprising walls forming cells, wherein the walls of the honeycomb structure inside the cells are coated with a viscoelastic material configured to dampen sound in a pre-selected frequency range; and
A second face sheet connected to the core, the second face sheet opposite the first face sheet relative to the core.

2. The sound-damping panel of claim 1, wherein the sound-damping panel comprises a floor board for installation in an aircraft.

3. The sound-damping panel of claim 1, wherein the cells have at least one of a hexagonal shape, rectangular shape, diamond shape, or circular shape.

4. The sound-damping panel of claim 1, wherein at least one of the first face sheet or the second face sheet has a coating of the viscoelastic material.

5. The sound-damping panel of claim 1, wherein only the first face sheet, the core, and the second face sheet are present in the sound-damping panel, whereby a sound-damping layer in the sound-damping panel is avoided.

6. The sound-damping panel of claim 1, wherein the core is free of polypropylene.

7. The sound-damping panel of claim 1, wherein the first face sheet and the second face sheet are free of the viscoelastic material.

8. A method of forming a sound-damping panel, the method comprising:
Fabricating a honeycomb core; and
Coating the honeycomb core with a viscoelastic fluid configured to dampen sound in a pre-selected frequency range, whereby a viscoelastic coating is formed, wherein the viscoelastic fluid is a liquid during the coating;
Thereafter curing the viscoelastic fluid coating; and
Thereafter laying up a first face sheet on a first side of the honeycomb core and laying up a second face sheet on a second side of the honeycomb core, opposite the first side, whereby the sound-damping panel is formed.

9. The method of claim 8 wherein coating comprises dipping the honeycomb core in the viscoelastic fluid.

10. The method of claim 8 further comprising:
prior to curing the honeycomb core, blowing air through cells of the honeycomb core to clear interstices of the cells of the viscoelastic fluid.

11. The method of claim 8, wherein curing comprises curing at room temperature.

12. The method of claim 8, wherein curing comprises curing above room temperature.

13. The method of claim 8 further comprising:
after curing but prior to laying up the first face sheet, preparing a surface of the honeycomb core.

14. The method of claim 13, wherein preparing comprises at least one of sanding the surface, chemically etching the surface, routing the surface, and cutting the surface.

15. The method of claim 8 further comprising:
after laying up the first face sheet and the second face sheet, performing a second curing process on the sound-damping panel.

16. The method of claim 8, wherein, after performing only fabricating, coating, curing, and laying up the first face sheet and the second face sheet, formation of the sound-damping panel is complete, whereby no additional layers are added to the sound-damping panel.

17. A method of forming a sound-damping panel, the method comprising:
Fabricating a honeycomb core; and
Pressing an elastomeric film into the honeycomb core, the elastomeric film comprising a material configured to dampen sound in a pre-selected frequency range;
Thereafter curing the honeycomb core; and
Thereafter laying up a first face sheet on a first side of the honeycomb core and laying up a second face sheet on a second side of the honeycomb core, opposite the first side, whereby the sound-damping panel is formed.

18. The method of claim 17 further comprising:
performing a second cure process after laying up the first face sheet and the second face sheet.

19. The method of claim 17, wherein after performing only fabricating, pressing, curing, and laying up the first face sheet and the second face sheet, formation of the sound-damping panel is complete, whereby no additional layers are added to the sound-damping panel.

20. The method of claim 17 further comprising: after curing but prior to laying up the first face sheet, preparing a surface of the honeycomb core.

* * * * *